US011853692B1

(12) United States Patent
Gundrum et al.

(10) Patent No.: US 11,853,692 B1
(45) Date of Patent: *Dec. 26, 2023

(54) PERFORMING SERVER-SIDE AND CLIENT-SIDE OPERATIONS ON SPREADSHEETS

(71) Applicant: Google LLC, Mountain View, CA (US)

(72) Inventors: Daniel Gundrum, New York, NY (US); Zachary Erik Lloyd, Brooklyn, NY (US); Joshua Ari Danziger, Metuchen, NJ (US); Amod Karve, Clifton, NJ (US)

(73) Assignee: Google LLC, Mountain View, CA (US)

(*) Notice: Subject to any disclaimer, the term of this patent is extended or adjusted under 35 U.S.C. 154(b) by 50 days.

This patent is subject to a terminal disclaimer.

(21) Appl. No.: 16/411,118

(22) Filed: May 13, 2019

Related U.S. Application Data

(63) Continuation of application No. 15/841,139, filed on Dec. 13, 2017, now Pat. No. 10,289,673, which is a continuation of application No. 14/135,854, filed on Dec. 20, 2013, now Pat. No. 9,875,226.

(51) Int. Cl.
*G06F 40/18* (2020.01)
(52) U.S. Cl.
CPC .................................... *G06F 40/18* (2020.01)
(58) Field of Classification Search
None
See application file for complete search history.

(56) References Cited

U.S. PATENT DOCUMENTS

| | | | |
|---|---|---|---|
| 6,654,713 B1 | 11/2003 | Rethman et al. | |
| 7,796,742 B1 | 9/2010 | Sutaria et al. | |
| 9,875,226 B1 * | 1/2018 | Gundrum | G06F 40/18 |
| 10,289,673 B1 * | 5/2019 | Gundrum | G06F 40/18 |
| 2001/0049713 A1 | 12/2001 | Arnold et al. | |
| 2005/0229101 A1 | 10/2005 | Matveyenko et al. | |
| 2006/0136534 A1 * | 6/2006 | Boon | G06F 40/18 |
| | | | 708/200 |
| 2006/0236324 A1 | 10/2006 | Gissel et al. | |
| 2007/0022155 A1 | 1/2007 | Owens et al. | |
| 2008/0229184 A1 | 9/2008 | Prish et al. | |
| 2009/0112990 A1 * | 4/2009 | Campbell | G06F 16/954 |
| | | | 709/205 |
| 2009/0113284 A1 | 4/2009 | Kulkarni et al. | |

(Continued)

*Primary Examiner* — Asher D Kells
(74) *Attorney, Agent, or Firm* — Lowenstein Sandler LLP

(57) ABSTRACT

A method for obtaining server-side and client-side calculations performed in a document includes presenting, on a client computer, the document stored on a server and receiving an input, where the input causes a calculation in the document. The client computer performs the calculation on the client computer and sends the input to the server to concurrently perform the calculation on the server. The client computer obtains a first result from the calculation performed on the client computer and a second result from the calculation performed on the server, selects the first result or the second result as a selected result based on which of the first result or the second result is obtained quicker from the calculation performed on the client computer and the calculation performed on the server, and presents, in the document, the selected result to the user.

20 Claims, 7 Drawing Sheets

(56) References Cited

U.S. PATENT DOCUMENTS

| | | | |
|---|---|---|---|
| 2009/0235154 A1* | 9/2009 | Khen | H04L 67/133 |
| | | | 715/219 |
| 2009/0292730 A1 | 11/2009 | Li et al. | |
| 2010/0057831 A1* | 3/2010 | Williamson | G06F 9/5027 |
| | | | 709/203 |
| 2010/0174886 A1* | 7/2010 | Kimelman | G06F 9/4818 |
| | | | 712/28 |
| 2011/0307772 A1* | 12/2011 | Lloyd | G06F 40/18 |
| | | | 715/212 |
| 2012/0046966 A1 | 2/2012 | Chang et al. | |
| 2012/0192052 A1* | 7/2012 | Caplan | G06F 40/18 |
| | | | 715/219 |
| 2013/0117651 A1* | 5/2013 | Waldman | G06F 9/44526 |
| | | | 715/220 |

* cited by examiner

400

402

|    | A  | B | C | D | E |
|----|----|---|---|---|---|
| 1  | 37 |   |   |   |   |
| 2  | 49 |   |   |   |   |
| 3  | 15 |   |   |   |   |
| 4  | 96 |   |   |   |   |
| 5  | 2  |   |   |   |   |
| 6  |    |   |   |   |   |
| 7  |    |   |   |   |   |
| 8  |    |   |   |   |   |
| 9  |    |   |   |   |   |
| 10 |    |   |   |   |   |

404

B2 = sum(A1:A5)

406

B4 = log(A4^A3, A2) / (sum(A1:A5)*average(A1:A4))

FIG. 4

PERFORMING SERVER-SIDE AND CLIENT-SIDE OPERATIONS ON SPREADSHEETS

RELATED APPLICATIONS

This application is a continuation application of co-pending U.S. patent application Ser. No. 15/841,139, filed Dec. 13, 2017, entitled, "PERFORMING SERVER-SIDE AND CLIENT-SIDE OPERATIONS ON SPREADSHEETS," which claims priority to U.S. patent application Ser. No. 14/135,854, filed on Dec. 20, 2013, entitled, "PERFORMING SERVER-SIDE AND CLIENT-SIDE OPERATIONS ON SPREADSHEETS," now U.S. Pat. No. 9,875,226, which is incorporated by reference herein in its entirety.

BACKGROUND

Cloud computing services allow users to create, edit, share, and collaborate on files that are stored on the cloud computing service. Users connect to the cloud computing service over a remote network such as the Internet. Files that may be stored on the cloud computing service include word processing documents, spreadsheets, presentations, images, audio files, video files, and many other types of documents and files. The cloud computing service also provides document editing applications for displaying and editing certain files. These applications are sent from the cloud computing service to a client computer and displayed on a web browser executing on the client computer. For example, a cloud computing service may send to a client computer a document editing application for displaying and editing spreadsheets stored on the cloud computing service.

A document editing application for spreadsheets provided by the cloud computing service may also have a calculation engine for performing calculations on the spreadsheets. When a user inputs values or commands into a spreadsheet that result in a calculation, the calculation is performed locally and the result is displayed to the user. Alternatively, all user input may be sent to the cloud computing service, which also has a calculation engine that performs the calculation. The result is sent to the client computer for display. In some cases, the calculation may be performed more quickly by the cloud computing service than the client computer. For example, the servers of the client computing service may be able to handle complex calculations better than the client computer. In another example, the client computer may have limited memory or CPU speed for performing calculations, or may be handling other processes at the same time. On the other hand, simple calculations may be handled more quickly by the client computer because of network latency in communicating with the server. However, it is difficult to know a priori whether the cloud computing service or the client computer can perform calculations more quickly. Whether the cloud computing service or client computer is faster for a given calculation depends on a number of factors including the type of calculation and the current computing resources available to the server and the client computer.

SUMMARY

The systems and methods described herein provide a way to optimize calculations performed on a spreadsheet stored on a cloud computing service. Instead of performing the calculation solely on the client computer or the cloud computing service, the calculation is performed on both at the same time. Whichever calculation finishes more quickly is displayed to the user. A copy of a spreadsheet stored on a cloud computing service is loaded on a client computer. The cloud computing service also provides a document editing application to the client computer for viewing and editing the spreadsheet. The document editing application includes a calculation engine for performing calculations on the spreadsheet locally on the client computer. A user on the client computer inputs a value or command in the spreadsheet that causes a calculation in one or more cells of the spreadsheet. The calculation engine on the client computer performs the calculation. At the same time, the input is sent to the cloud computing service, where the calculation is performed and sent back to the client computer. The document editing application displays the result of whichever calculation completes sooner: the server-side or client-side calculation. The slower result may be discarded or used to verify the accuracy of the quicker result.

One aspect described herein discloses a method for obtaining server-side and client-side calculations performed on a spreadsheet. The method includes loading, on a client computer, a spreadsheet stored on a server and receiving an input from a user on the client computer, where the input causes a calculation of one or more cell values in the spreadsheet. The method further includes performing the calculation of the one or more cell values on the client computer and sending the input to the server to perform the calculation of the one or more cell values on the server. The method further includes displaying in the spreadsheet a result of the calculation of the one or more cell values to the user, where the result of the calculation is taken from the quicker of the calculation performed on the client computer or the calculation performed on the server.

Another aspect described herein discloses a method for providing server-side and client-side calculations on a spreadsheet. The method includes storing a spreadsheet and a document editing application on a server, where the document editing application is configured to display the spreadsheet on a client computer, receive an input from a user on the client computer, where the input causes a calculation of one or more cell values in the spreadsheet, perform the calculation of one or more cell values on the client computer, send the input to the server to perform the calculation of one or more cell values, and display in the spreadsheet a result of the calculation of the one or more cell values taken from the quicker of the calculation performed on the client computer or the calculation performed on the server. The method further includes sending a copy of the spreadsheet and a copy of the document editing application to the client computer, receiving the input from the client computer, performing the calculation of the one or more cell values on the server, and sending a result of the calculation of the one or more cell values to the client computer.

Another aspect described herein discloses an apparatus for providing server-side and client-side calculations on a spreadsheet. The apparatus includes a server configured to communicate with a plurality of client computers and store a spreadsheet and a document editing application. The document editing application is configured to display the spreadsheet on a first client computer in the plurality of client computers, receive an input from a user on the first client computer, where the input causes a calculation of one or more cell values in the spreadsheet, perform the calculation of one or more cell values on the first client computer, send the input to the server to perform the calculation of one or more cell values, and display in the spreadsheet a result of the calculation of the one or more cell values taken from the quicker of the calculation performed on the first client computer or the calculation performed on the server. The server is further configured to send a copy of the spreadsheet and a copy of the document editing application to the first client computer, receive the input from the first client computer, perform the calculation of the one or more cell values, and send a result of the calculation of the one or more cell values to the first client computer.

Another aspect described herein discloses a system for performing server-side and client-side calculations on a spreadsheet. The system includes a client computer and a server. The client computer is configured to load a copy of a spreadsheet stored on a server, receive an input from a user, where the input causes a calculation of one or more cell values in the spreadsheet, and perform the calculation of the one or more cell values. The client computer is further configured to send the input to the server for calculation of the one or more cell values, and display in the copy of the spreadsheet a result of the calculation of the one or more cell values to the user, where the result of the calculation is taken from the quicker of the calculation performed on the first client computer or the calculation performed on the server. The server is configured to send the copy of the spreadsheet to the client computer, receive the input from the client computer, perform the calculation of the one or more cell values, and send the result of the calculation of the or more cell values to the client computer.

BRIEF DESCRIPTION OF THE DRAWINGS

The methods and systems may be better understood from the following illustrative description with reference to the following drawings in which:

FIG. 4 shows an example of a spreadsheet stored on a server hosting a cloud computing service in accordance with an implementation as described herein;

DETAILED DESCRIPTION

To provide an overall understanding of the systems and methods described herein, certain illustrative embodiments will now be described. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server, service, or system as used in this description may be a single computing device or multiple computing devices working collectively and in which the storage of data and the execution of functions are spread out among the various computing devices.

Aspects of the systems and methods described herein relate to providing server-side and client-side calculations on a spreadsheet stored on a cloud computing service. A spreadsheet stored on a server hosting a cloud computing service and a document editing application for editing the spreadsheet is loaded on a client computer. The document editing application includes a calculation engine for performing calculations on the spreadsheet locally on the client computer, while the server also has a calculation engine. A user on the client computer inputs a value or command in the spreadsheet that causes a calculation in one or more cells of the spreadsheet. The calculation engine on the client computer performs the calculation while the client computer simultaneously sends the input to the server. The server-side calculation engine also performs the calculation and returns the result to the client computer. The document editing application displays the result of whichever calculation completes sooner, whether server-side or client-side.

Figure 1:
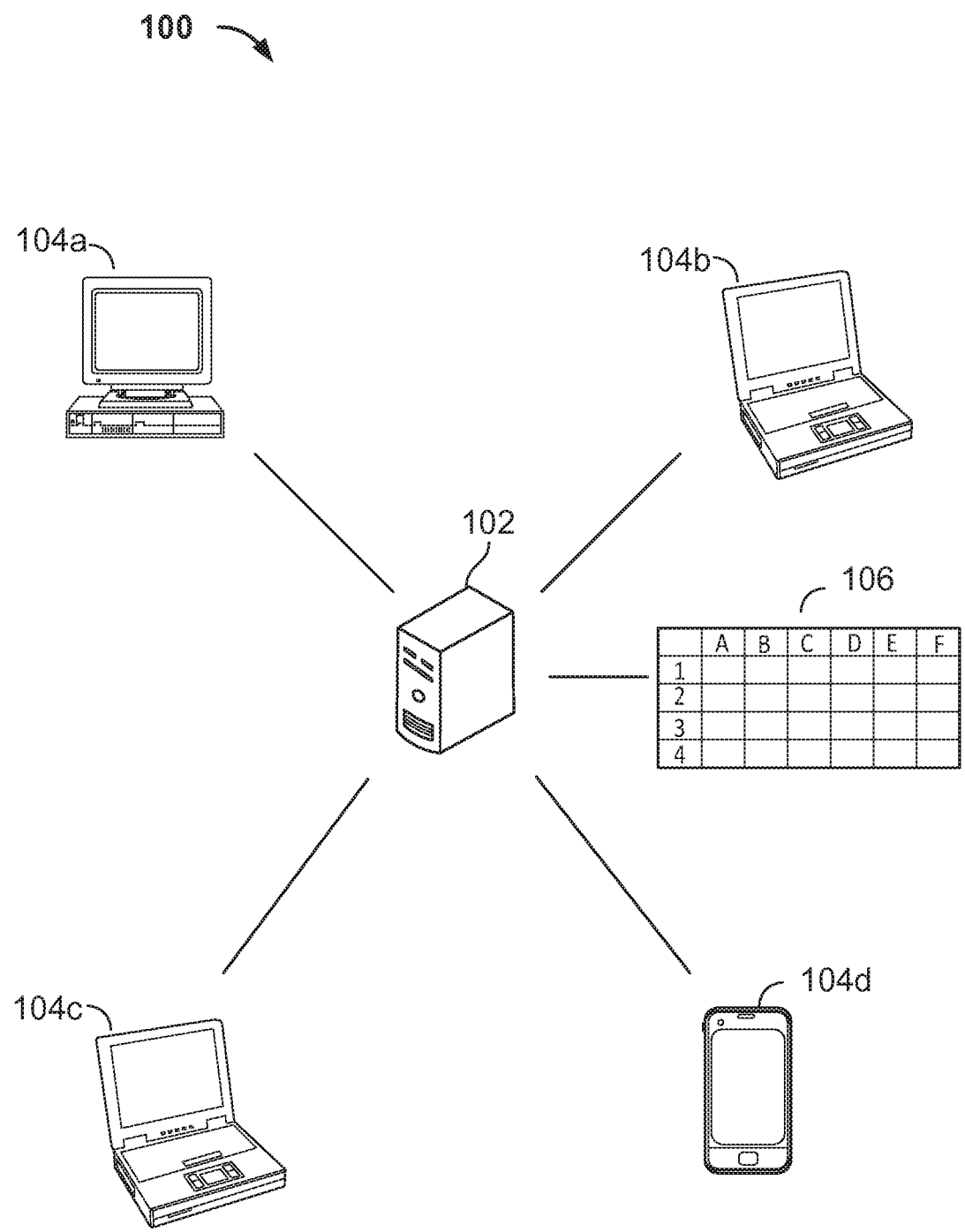
FIG. 1 shows a number of client computers in communication with a cloud computing service in accordance with an implementation as described herein.

First, a network system in which a number of client computers may connect to a server is described. FIG. 1 shows a network system 100 that includes cloud computing service 102 and a number of client computers 104*a* through 104*d*. Cloud computing service 102 may include one or more servers that collectively provide online content and services for a number of client computers. Cloud computing service 102 stores a number of files accessible by client computers, including spreadsheet 106. Other files that may be stored on cloud computing service 102 include word processing documents, presentations, images, audio files, video files, or any other files of various open or proprietary file types. Users may create, edit, copy, share, and delete files stored on the cloud computing service. Client computers 104*a*-104*d* may include desktop computers, laptop computers, tablets, smart phones, mobile electronic devices, or any other device that may connect to cloud computing service 102. System 100 may include many additional client computers not pictured in FIG. 1. The network connection between the client computers 104*a*-104*d* and cloud computing service 102 in network system 100 may be facilitated through a local area network, wide area network, Ethernet, fiber optic network, or any other wired or wireless connection.

Figure 2:
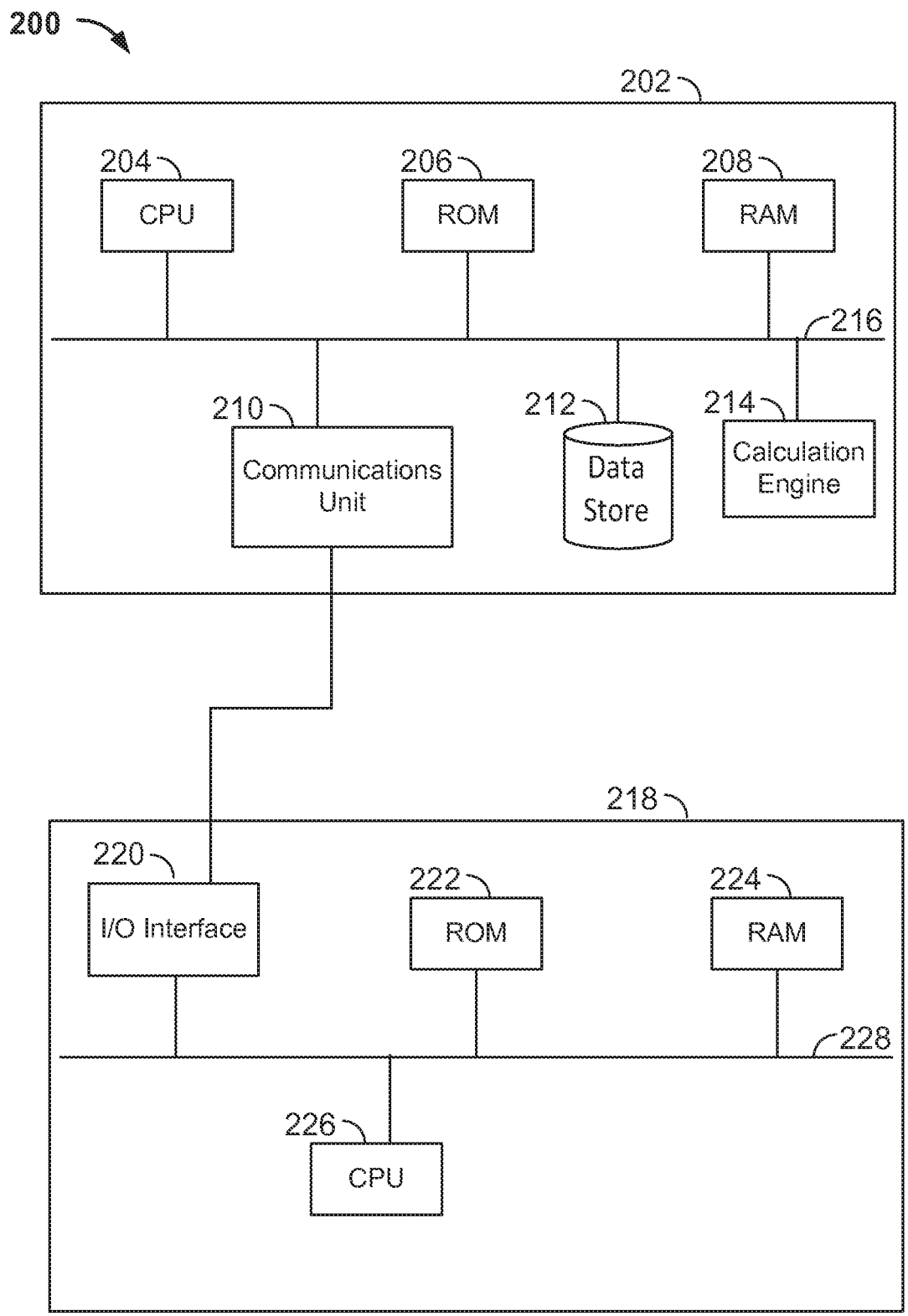
FIG. 2 shows the components of a cloud computing service in communication with a client computer in accordance with an implementation as described herein.

The components of a client computer and a cloud computing service in communication with each other are now described in more detail. System 200 in FIG. 2 includes a cloud computing service 202 in communication with a client computer 218. Cloud computing service 202 includes a central processing unit (CPU) 204, read-only memory (ROM) 206, random access memory (RAM) 208, communications unit 210, data store 212, calculation engine 214, and bus 216. Server 202 may have additional components that are not illustrated in FIG. 2. Bus 216 allows the various components of server 202 to communicate with each other. Communications unit 210 allows server 202 to communicate with other devices, such as client computer 218 and other client computers, as well as third-party servers. Data store 212 is used to store content accessible by a user on client computer 218, such as documents and files stored by users on cloud computing service 202. Calculation engine 214 stores algorithms and routines for performing calculations on spreadsheets stored in data store 212. Calculation engine 214 may be implemented in Javascript, Java crosscompiled into Javascript, C++, or any other programming language. Cloud computing service 202 provides client computer 218 with a document editing application for displaying and editing a document stored in data store 212. The document editing application includes a calculation engine, which may or may not have the same capabilities as calculation engine 214.

Client computer 218 includes a CPU 226, ROM 222, RAM 224, input/output interface 220, and bus 228. Client computer 218 may have additional components that are not illustrated in FIG. 2. Bus 228 allows the various components of client computer 218 to communicate with each other. Input/output interface 220 allows client computer 218 to communicate with other devices, such as cloud computing service 202. Input/output interface 220 also includes devices for taking in user inputs and displaying outputs to a user, such as a keyboard, mouse, and display screen. CPU 226 executes various programs stored in memory on client computer 218, such as a web browser. Web browsers are used, among other things, to display content and services provided by cloud computing service 202 such as a document editing application configured to display a document stored on cloud computing service 202 to the user. Web browsers receive web page documents encoded in HTML, CSS, Javascript, or other web-compatible languages and interpret the language to properly display the web page. The document editing application may also be a stand-alone application executable on client computer 218.

Data store 212 for storing content on cloud computing service 202, calculation engine 214, a web browser executing on client computer 218, and other data structures and software programs in system 200 may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and read-only, once-writable, or rewriteable optical disks (such as, e.g., CD-ROM, CD-R, CD+R, CD-RW, CD+RW, DVD-ROM, DVD-R, DVD+R, DVD-RW, and DVD+RW).

Figure 3:
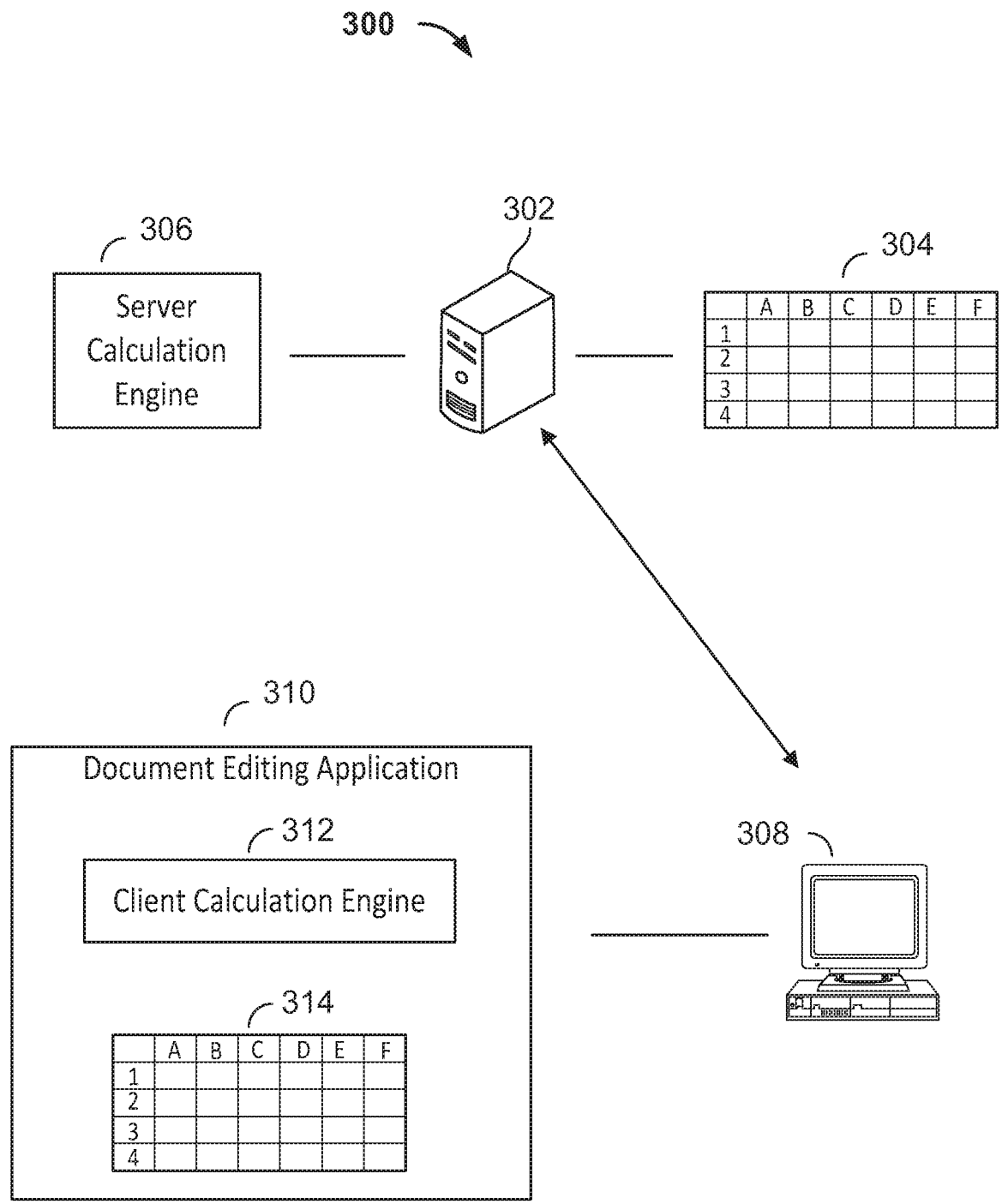
FIG. 3 shows a server hosting a cloud computing service providing a document editing application to a client computer in accordance with an implementation as described herein.

FIG. 3 shows a system 300 that includes a server 302 and a client computer 308. Server 302 hosts a cloud computing service that stores spreadsheet file 304. Server 302 also has a server calculation engine 306 for calculating functions and cell values in spreadsheet 304. Spreadsheets often have arithmetic, statistical, scientific, and other functions that users can insert within the spreadsheet. Through the use of such functions, values of one or more cells in spreadsheet 304 may depend on the values of one or more other cells in spreadsheet 304. A user on client computer 308 may access spreadsheet 304 stored on server 302 through a remote network, such as the Internet. Server 302 sends a document editing application 310 to client computer 308 so that the user may view and edit spreadsheet 304. Document editing application 310 may be a stand-alone application or may execute within a web browser on client computer 308. Document editing application 310 may be implemented in Javascript, HTML, CSS, or other programming languages. Server 302 loads a copy of spreadsheet 304 onto client computer 308, shown as local copy 314. Edits made to local copy 314 are synchronized with spreadsheet 304 stored on server 302. Multiple users may access spreadsheet 304 and server 302 is responsible for reconciling edits made by each user.

Document editing application 310 also has a client calculation engine 312 that performs calculations for local copy 314 of the spreadsheet. Server calculation engine 306 has at least as much functionality as client calculation engine 312 and may have additional functionality beyond client calculation engine 312. For example, server calculation engine 306 may have the ability to draw data from external databases for certain calculations but client calculation engine 312 may not have this ability. When a user on client computer 308 inputs a cell value or inputs a function into a cell, this may cause a calculation to occur. For example, the value of a first cell may be used to calculate the value of a second cell, so changing the value of the first cell causes a recalculation of the value of the second cell. The calculation may be performed by client calculation engine 312. Alternatively, client computer 308 may send the user input to server 302. Server calculation engine 306 performs the calculation and server 302 sends the results back to client computer 308. Usually all calculations are performed by one of the calculation engines, either server-side or client-side.

There are some instances where performing a spreadsheet calculation may be completed faster on the server than on the client computer, and vice versa. For example, simple calculations may be handled more quickly by the client computer because of the lag time involved in communicating with the server. Some calculations may be complex or involve many cells and the server has more computing resources such as memory and processor availability to handle the calculation. For example, FIG. 4 shows a spreadsheet 400 stored on a server hosting a cloud computing service and loaded on a client computer. Spreadsheet 400 shows several values entered into Column A. The user enters equation 404 in cell B2 and equation 406 into cell B4. Equation 404 is a simple sum of the values of five cells and the calculation is usually completed faster on the client computer than on the server. Equation 406 is more complex and involves several different mathematical functions. The server generally has more memory, processor speed, and other computer resources than the client computer, so the server may complete the calculation of equation 406 faster even taking into account the lag time of communicating between the server and the client computer.

Variables such as the computing resources currently available to the server and the client computer, the bandwidth of the connection between the server and the client computer, and the complexity of the calculation all affect whether server-side or client-side calculations are faster. It is difficult to determine a priori whether the server or client computer is faster for any particular calculation. Thus it is difficult to take advantage of the fact that certain calculations may be completed faster if allocated to either the server or the client computer. The systems and methods described herein optimize the situation by having both the server and the client computer perform the calculation. The client computer displays the result of whichever calculation completes first. There is no need to predict a priori whether the server or the client computer can complete the calculation first. While this approach duplicates work by replicating the calculation on both the client computer and the server, it does not impede the ability of the user to continue work on the spreadsheet. The server is capable of handling many calculations received from various users and the users benefit when the server completes those calculations faster. If the client computer completes the calculation faster, then the user also receives the benefit.

Figure 5:
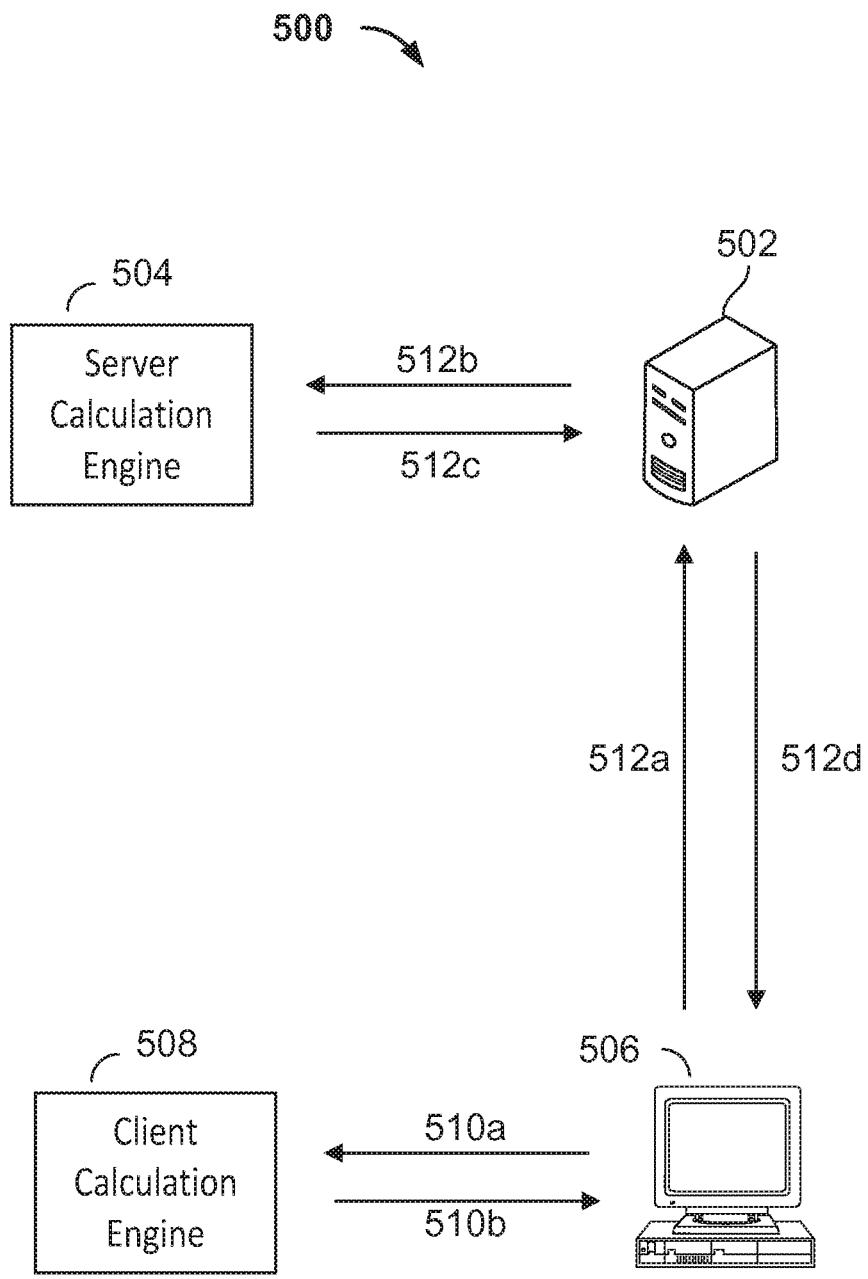
FIG. 5 shows the information flow of a server-side and client side calculation in a spreadsheet in accordance with an implementation as described herein.

FIG. 5 shows a diagram of the information flow for dual server-side and client-side calculations on a spreadsheet.

System 500 includes a server 502 running a cloud computing service and a client computer 506. Server 502 stores a spreadsheet that is loaded onto client computer 506 through a document editing application. Server 502 has a server calculation engine 504 for performing calculations on the spreadsheet, while the document editing application on client computer 506 has a client calculation engine 508 that also performs calculations on the spreadsheet. A user on client computer 506 enters an input, which may be a cell value or a function into the spreadsheet. This input causes a calculation of the values of one or more cells in the spreadsheet. The input is sent to client calculation engine at 510a, which performs the calculation and sends back the result at 510b. At the same time, client computer 506 sends the input to server 502 at 512a. Server 502 passes the input to server calculation engine 504 at 512b, which performs the calculation and outputs the result at 512c. Server 502 then sends the result to client computer 506 at 512d. The document editing application displays the result of the quicker calculation to the user, whether it is the client-side calculation along path 510a to 510b, or the server-side calculation along path 512a to 512d.

Once client computer 506 receives the slower of the two calculations, it may either ignore the slower result or use the slower result to verify that the quicker result is correct. For example, client computer 506 may compare the two results and determine if they match for a specified number of significant figures. Client computer 506 or server 502 may be designated as the master calculator such that when the two results do not match, the result of the master calculator is deemed correct. Alternatively, once client computer 506 receives the quicker result, it may attempt to cancel the other calculation. If there is no connection between client computer 506 and server 502, the document editing application is limited to client-side calculations only. The document editing application may also be configured to send the input to multiple servers at the same time for calculation and display the quickest result out of the multiple servers and the client computer. The server or the client computer may be configured to keep track of whether the server-side calculation or client-side calculation is faster, and may adapt if one is consistently faster than the other. For example, if the server-side calculation is consistently faster than the client-side calculation, then the document editing application may cease performing calculations on the client computer for the rest of the current session.

Figure 6:
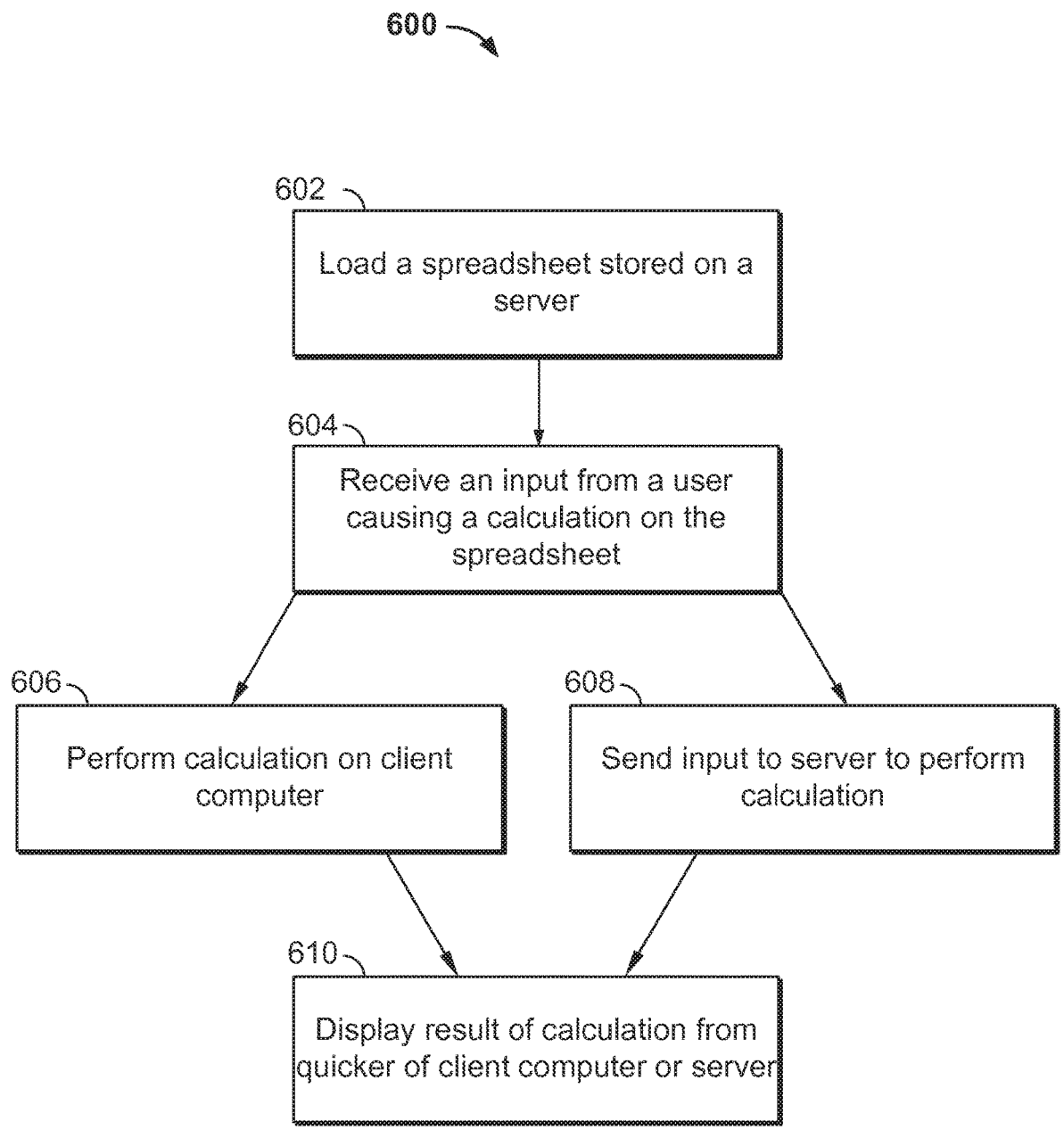
FIG. 6 shows a method for obtaining server-side and client-side calculations performed on a spreadsheet in accordance with an implementation as described herein.

Methods are now described for obtaining, on a client computer, both server-side and client-side calculations performed on a spreadsheet stored on the server. FIG. 6 shows a method 600 that includes loading, on a client computer, a spreadsheet stored on a server and receiving an input from a user on the client computer, where the input causes a calculation of one or more cell values in the spreadsheet. The method further includes performing the calculation of the one or more cell values on the client computer and sending the input to the server to perform the calculation of the one or more cell values on the server. The method further includes displaying in the spreadsheet a result of the calculation of the one or more cell values to the user, where the result of the calculation is taken from the quicker of the calculation performed on the client computer or the calculation performed on the server. Method 600 may be performed on any client computer, such as client computers 104a-104d in FIG. 1, client computer 218 in FIG. 2, client computer 308 in FIG. 3, and client computer 506 in FIG. 5.

Method 600 begins when a spreadsheet stored on a server is loaded on a client computer, shown at 602. The server may host a cloud computing service and a user on the client computer accesses the server to view and edit the spreadsheet. The server provides the client computer with a document editing application for viewing and editing the spreadsheet. The document editing application may be a standalone application that executes on the client computer or may be executed within a web browser on the client computer. The document editing application includes, among other things, a calculation engine for performing calculations on the spreadsheet. The server retains a master copy of the spreadsheet and sends a copy of the spreadsheet to the client computer. The client computer then receives an input from a user on the client computer, shown at 604. The input causes a calculation of one or more cell values in the spreadsheet. For example, the input may be changing the value of a cell, where the value of other cells may be dependent on the value of that cell. In another example, the input may be inserting a function or equation in a cell, which is calculated once the user enters the function or equation. Other inputs that may cause a calculation include sorting or filtering the data in the spreadsheet or generating charts and graphs.

After the client computer receives the input from the user, the client computer performs the calculation of the one or more cell values, shown at 606. The calculation engine in the document editing application performs the calculation. At the same time, the document editing application sends the input to the server to perform the calculation, shown at 608. The server also has a calculation engine. The server also performs the calculation and sends the result back to the document editing application on the client computer. If there is no connection between the client computer and the server, calculation only occurs on the client computer. The client computer then displays the result of the calculation, shown at 610. The result displayed is the quicker of the calculation performed on the client computer and the calculation performed on the server and sent to the client computer. The slower calculation may be used to verify the accuracy of the quicker calculation or may be discarded. The client computer may also attempt to cancel the slower calculation if it is still in progress. As calculations are performed in this manner, the client computer or server may store completion information of whether the client computer or server performs the calculation faster. If one is consistently faster than the other, the client computer or server may direct only the faster of the two to perform future calculations during the current session. If other collaborators are also viewing or editing the spreadsheet, the results of the calculation are propagated to the other collaborators for display. In this manner, method 600 provides a way for obtaining server-side and client-side calculations for a spreadsheet on a client computer.

Figure 7:
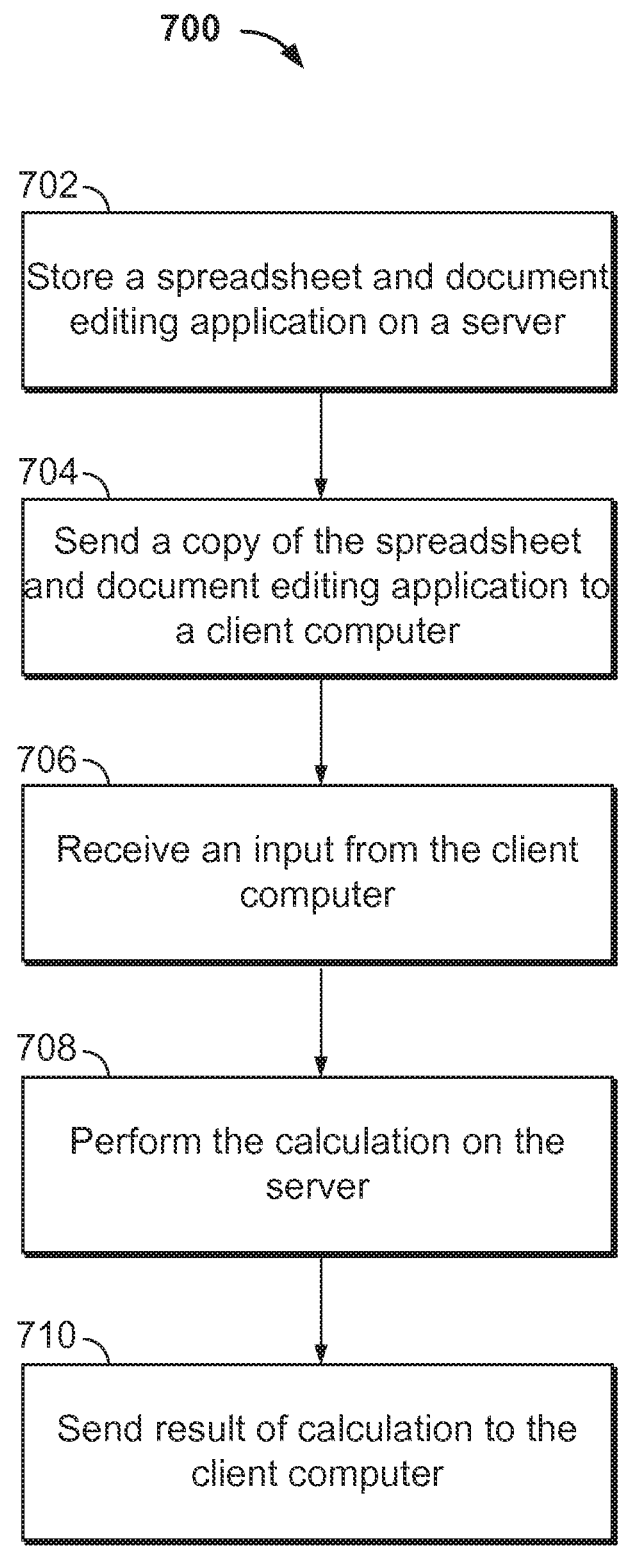
FIG. 7 shows a method for providing server-side and client-side calculations on a spreadsheet in accordance with an implementation as described herein.

While method 600 depicts a method performed by a client computer to obtain server-side calculations in addition to client-side calculations for a spreadsheet, method 700 in FIG. 7 is a method performed by a server to provide those server-side calculations to a client computer. Method 700 includes storing a spreadsheet and a document editing application on a server, where the document editing application is configured to display the spreadsheet on a client computer, receive an input from a user on the client computer, where the input causes a calculation of one or more cell values in the spreadsheet, perform the calculation of one or more cell values on the client computer, send the input to the server to perform the calculation of one or more cell values, and display in the spreadsheet a result of the calculation of the one or more cell values taken from the quicker of the calculation performed on the client computer or the calculation performed on the server. The method further includes sending a copy of the spreadsheet and a copy of the document editing application to the client computer, receiving the input from the client computer, performing the calculation of the one or more cell values on the server, and sending a result of the calculation of the one or more cell values to the client computer. Method 700 may be performed on any server hosting a cloud computing service, such as cloud computing service 102 in FIG. 1, cloud computing service 202 in FIG. 2, server 302 in FIG. 3, and server 502 in FIG. 5.

Method 700 begins when a server stores a spreadsheet and a document editing application, shown at 702. The server may host a cloud computing service stores the spreadsheet and provides users with access to view or edit the spreadsheet through the document editing application. The document editing application is configured to display the spreadsheet on a client computer and receive input from a user on the client computer. An input may cause a calculation of one or more cell values in the spreadsheet. The document editing application performs the calculation of one or more cell values on the client computer and at the same time sends the input to the server to perform the same calculation. The document editing application then displays in the spreadsheet a result of the calculation of the one or more cell values taken from the quicker of the calculation performed on the client computer or the calculation performed on the server. The document editing application may be a stand-alone application that executes on the client computer or may be executed within a web browser on the client computer. The document editing application includes, among other things, a calculation engine for performing calculations on the spreadsheet.

When a user on the client computer requests access to the spreadsheet, the server sends a copy of the spreadsheet and a copy of the document editing application to the client computer, shown at 704. The server retains a master copy of the spreadsheet. After sending a copy of the spreadsheet and document editing application to the client computer, the server receives an input from the client computer, shown at 706. The input causes a calculation of one or more cell values in the spreadsheet. For example, the input may be changing the value of a cell, where the value of other cells may be dependent on the value of that cell. In another example, the input may be inserting a function or equation in a cell, which is calculated once the user enters the function or equation. Other inputs that may cause a calculation include sorting or filtering the data in the spreadsheet or generating charts and graphs.

After receiving the input, the server performs the calculation of the one or more cell values, shown at 708. The server has a calculation engine that performs the calculation. At the same time, the client computer also performs the calculation. The document editing application executing on the client computer has a calculation engine that performs the calculation. After performing the calculation, the server sends the result to the client computer, shown at 710. The client computer then displays the result of the calculation from the quicker of the calculation performed on the client computer and the calculation performed on the server and sent to the client computer. The slower calculation may be used to verify the accuracy of the quicker calculation or may be discarded. The client computer may also attempt to cancel the slower calculation if it is still in progress. As calculations are performed in this manner, the client computer or server may store completion information of whether the client computer or server performs the calculation faster. If one is consistently faster than the other, the client computer or server may direct only the faster of the two to perform future calculations during the current session. If other collaborators are also viewing or editing the spreadsheet, the results of the calculation are propagated to the other collaborators for display. In this manner, method 700 provides a way for providing server-side and client-side calculations on a spreadsheet.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method comprising:
   launching, on a client computer, a document editing application associated with a cloud storage system, wherein the document editing application has a client calculation engine for performing spreadsheet calculations on the client computer;
   presenting, via the document editing application on the client computer, a web-based collaborative spreadsheet stored on the cloud storage system, wherein the web-based collaborative spreadsheet comprises a plurality of cells, wherein calculations for one or more of the plurality of cells in the web-based collaborative spreadsheet are to be performed by at least one of the client calculation engine on the client computer or a server calculation engine on the cloud storage system;
   receiving an input for a first cell of the plurality of cells in the web-based collaborative spreadsheet, wherein the input for the first cell of the plurality of cells in the web-based collaborative spreadsheet causes a calculation that involves at least one or more second cells of the plurality of cells in the web-based collaborative spreadsheet; and
   upon receiving the input that causes the calculation involving at least the one or more second cells of the plurality of cells in the web-based collaborative spreadsheet:
      determining to perform the calculation, caused by the input for the first cell of the plurality of cells and involving at least the one or more second cells of the plurality of cells, by the client calculation engine on the client computer or the server calculation engine of the cloud storage system,
      wherein determining to perform the calculation by the client calculation engine or the server calculation engine is based on a network connection between the client computer and the cloud storage system, and one or more factors defining a speed of the calculation, the one or more factors comprising at least one of computing resources available at the client computer and the cloud storage system, or a type of the calculation;

responsive to determining to perform the calculation by the client calculation engine on the client computer, performing the calculation, caused by the input for the first cell of the plurality of cells in the web-based collaborative spreadsheet and involving at least the one or more second cells of the plurality of cells in the web-based collaborative spreadsheet, by the client calculation engine on the client computer, wherein responsive to determining to perform the calculation by the server calculation engine of the cloud storage system, the input is sent to the cloud storage system to perform the calculation by the server calculation engine of the cloud storage system;

obtaining a first result from the calculation performed by the client calculation engine on the client computer or a second result from the calculation performed by the server calculation engine of the cloud storage system; and presenting, via the document editing application on the client computer, the obtained first result or second result in the web-based collaborative spreadsheet to a user.

2. The method of claim 1, further comprising verifying accuracy of the obtained first result or second result using another result from the first result or second result that is obtained slower than the obtained first result or second result.

3. The method of claim 2, wherein verifying the accuracy further comprises determining whether the other result matches the obtained first result or second result.

4. The method of claim 1, further comprising sending the input to a plurality of servers of the cloud storage system to perform the calculation on the plurality of servers.

5. The method of claim 1, further comprising storing, for a plurality of calculations, completion information of whether a result of each of the plurality of calculations completed quicker by the client computer or a respective server.

6. The method of claim 5, further comprising determining that subsequent calculations are to be performed exclusively by either the client computer or the server based on the completion information.

7. The method of claim 1, further comprising receiving, from the server, the document editing application for editing the web-based collaborative spreadsheet, wherein the document editing application has a calculation engine for performing the calculation on the client computer.

8. A non-transitory computer-readable media comprising instructions that, when executed by a processing device of a client computer, cause the processing device to perform operations comprising:

launching, on the client computer, a document editing application associated with a cloud storage system, wherein the document editing application has a client calculation engine for performing spreadsheet calculations on the client computer;

presenting, via the document editing application on the client computer, a web-based collaborative spreadsheet stored on the cloud storage system, wherein the web-based collaborative spreadsheet comprises a plurality of cells, wherein calculations for one or more of the plurality of cells in the web-based collaborative spreadsheet are to be performed by at least one of the client calculation engine on the client computer or a server calculation engine on the cloud storage system;

receiving an input for a first cell of the plurality of cells in the web-based collaborative spreadsheet, wherein the input for the first cell of the plurality of cells in the web-based collaborative spreadsheet causes a calculation that involves at least one or more second cells of the plurality of cells in the web-based collaborative spreadsheet; and upon receiving the input that causes the calculation involving at least the one or more second cells of the plurality of cells in the web-based collaborative spreadsheet:

determining to perform the calculation, caused by the input for the first cell of the plurality of cells and involving at least the one or more second cells of the plurality of cells, by the client calculation engine on the client computer or the server calculation engine of the cloud storage system, wherein determining to perform the calculation by the client calculation engine or the server calculation engine is based on a network connection between the client computer and the cloud storage system, and one or more factors defining a speed of the calculation, the one or more factors comprising at least one of computing resources available at the client computer and the cloud storage system, or a type of the calculation;

responsive to determining to perform the calculation by the client calculation engine on the client computer, performing the calculation, caused by the input for the first cell of the plurality of cells in the web-based collaborative spreadsheet and involving at least the one or more second cells of the plurality of cells in the web-based collaborative spreadsheet, by the client calculation engine on the client computer, wherein responsive to determining to perform the calculation by the server calculation engine of the cloud storage system, the input is sent to the cloud storage system to perform the calculation by the server calculation engine of the cloud storage system;

obtaining a first result from the calculation performed by the client calculation engine on the client computer or a second result from the calculation performed by the server calculation engine of the cloud storage system; and presenting, via the document editing application on the client computer, the obtained first result or second result in the web-based collaborative spreadsheet to a user.

9. The non-transitory computer-readable media of claim 8, wherein the operations further comprise verifying accuracy of the obtained first result or second result using another result from the first result or second result that is obtained slower than the obtained first result or second result.

10. The non-transitory computer-readable media of claim 9, wherein verifying the accuracy further comprises determining whether the other result matches the obtained first result or second result.

11. The non-transitory computer-readable media of claim 8, wherein the operations further comprise sending the input to a plurality of servers of the cloud storage system to perform the calculation on the plurality of servers.

12. The non-transitory computer-readable media of claim 8, wherein the operations further comprise storing, for a plurality of calculations, completion information of whether a result of each of the plurality of calculations completed quicker by the client computer or a respective server.

13. The non-transitory computer-readable media of claim 12, wherein the operations further comprise determining that subsequent calculations are to be performed exclusively by either the client computer or the server based on the completion information.

14. The non-transitory computer-readable media of claim 8, wherein the operations further comprise receiving, from the server, the document editing application for editing the web-based collaborative spreadsheet, wherein the document editing application has a calculation engine for performing the calculation on the client computer.

15. A system comprising:
a memory; and
a processing device, coupled to the memory, to perform operations comprising:
launching, on a client computer, a document editing application associated with a cloud storage system, wherein the document editing application has a client calculation engine for performing spreadsheet calculations on the client computer;
presenting, via the document editing application on the client computer, a web-based collaborative spreadsheet stored on the cloud storage system, wherein the web-based collaborative spreadsheet comprises a plurality of cells, wherein calculations for one or more of the plurality of cells in the web-based collaborative spreadsheet are to be performed by at least one of the client calculation engine on the client computer or a server calculation engine on the cloud storage system;
receiving an input for a first cell of the plurality of cells in the web-based collaborative spreadsheet, wherein the input for the first cell of the plurality of cells in the web-based collaborative spreadsheet causes a calculation that involves at least one or more second cells of the plurality of cells in the web-based collaborative spreadsheet; and
upon receiving the input that causes the calculation involving at least the one or more second cells of the plurality of cells in the web-based collaborative spreadsheet:
determining to perform the calculation, caused by the input for the first cell of the plurality of cells and involving at least the one or more second cells of the plurality of cells, by the client calculation engine on the client computer or the server calculation engine of the cloud storage system,
wherein determining to perform the calculation by the client calculation engine or the server calculation engine is based on a network connection between the client computer and the cloud storage system, and one or more factors defining a speed of the calculation, the one or more factors comprising at least one of computing resources available at the client computer and the cloud storage system, or a type of the calculation;
responsive to determining to perform the calculation by the client calculation engine on the client computer, performing the calculation, caused by the input for the first cell of the plurality of cells in the web-based collaborative spreadsheet and involving at least the one or more second cells of the plurality of cells in the web-based collaborative spreadsheet, by the client calculation engine on the client computer,
wherein responsive to determining to perform the calculation by the server calculation engine of the cloud storage system, the input is sent to the cloud storage system to perform the calculation by the server calculation engine of the cloud storage system;
obtaining a first result from the calculation performed by the client calculation engine on the client computer or a second result from the calculation performed by the server calculation engine of the cloud storage system; and
presenting, via the document editing application on the client computer, the obtained first result or second result in the web-based collaborative spreadsheet to a user.

16. The system of claim 15, wherein the operations further comprise verifying accuracy of the obtained first result or second result using another result from the first result or the second result that is obtained slower than the obtained first or second result.

17. The system of claim 16, wherein verifying the accuracy further comprises determining whether the other result matches the obtained first result or second result.

18. The system of claim 15, wherein the operations further comprise sending the input to a plurality of servers of the cloud storage system to perform the calculation on the plurality of servers.

19. The system of claim 15, wherein the operations further comprise storing, for a plurality of calculations, completion information of whether a result of each of the plurality of calculations completed quicker by the client computer or a respective server.

20. The system of claim 19, wherein the operations further comprise determining that subsequent calculations are to be performed exclusively by either the client computer or the server based on the completion information.

* * * * *